April 18, 1933.   W. B. LASHAR   1,904,479
REENFORCED CHAIN AND METHOD OF MAKING THE SAME
Filed Dec. 19, 1930
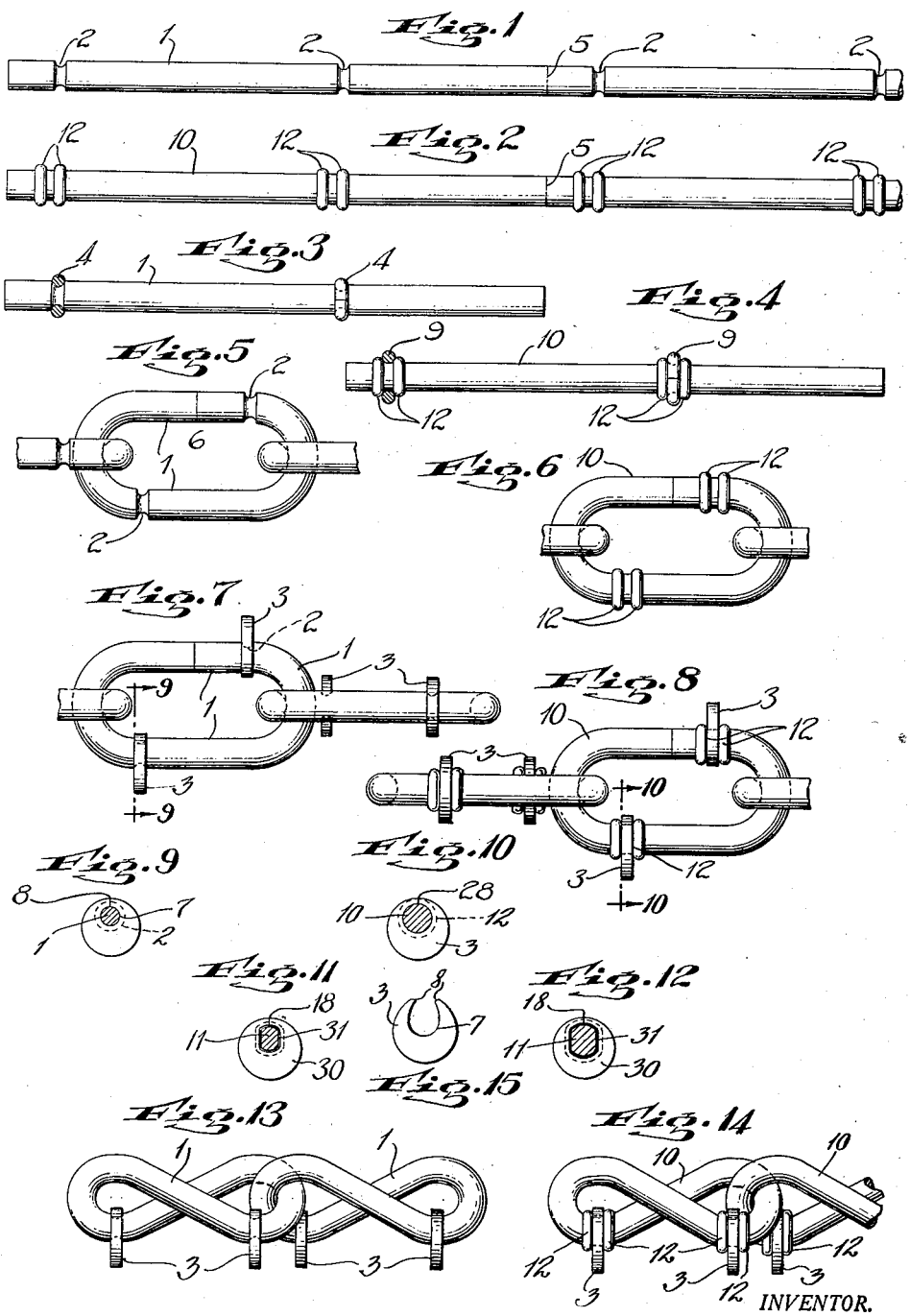
INVENTOR.
WALTER B. LASHAR
BY
Frederick S. Duncan, ATTORNEY Patented Apr. 18, 1933

1,904,479

UNITED STATES PATENT OFFICE

WALTER B. LASHAR, OF FAIRFIELD, CONNECTICUT, ASSIGNOR TO AMERICAN CHAIN COMPANY, INC., A CORPORATION OF NEW YORK

REENFORCED CHAIN AND METHOD OF MAKING THE SAME

Application filed December 19, 1930. Serial No. 503,401.

This invention relates to anti-skid tire chains and the general object of the invention is to provide a novel method for making said chains comprising the steps of forming shoulders upon a stock wire of suitable circular or non-circular cross section and applying separately formed substantially annular reenforcement members to said wire stock between adjacent shoulders in position to be held respectively by said shoulders against displacement lengthwise upon said wire, then severing from said stock wire successively parts including one or more of said shoulder portions and the reenforcement members held thereby, joining the ends of each of said parts to form a link and articulating said links to form a section of anti-skid tire chain and preferably twisting each of said links in such a manner as to bring one or more of the reenforced portions of said link into position for road contact, thereby forming a reenforced cross chain of the curb or twisted link type.

In carrying the invention into effect, the stock wire may be treated in any suitable manner to form the shoulders, as for example by swaging or otherwise working the stock to form grooves around the periphery of the wire, the walls of the groove acting as shoulders for the purpose of holding the reenforcements in place, or shoulders may be formed by swaging or otherwise working the stock wire to form thereon peripheral enlargements suitably placed so that a reenforcement member may be held in place between two adjacent enlargements, or stock wire may also be provided with suitable shoulders for the purpose described. The reenforcement members may likewise be formed of stock of any suitable material and may be shaped by any suitable method, as for example by cutting suitable pieces of wire from stock wire of circular or any desirable cross section and bending the same around the stock wire of which the strand is formed, at the region of the shoulder portions thereof, or reenforcement members of suitable shape may be formed by stamping them from sheet metal or they may be otherwise formed.

Such reenforcement members, formed approximately of the final shape desired, may be secured in place upon the stock wire by pressing them into position between the retaining shoulders or by springing them upon the stock wire forming the strand and they may be held in place by the clipping action of the metal or by welding or otherwise.

The reenforcement members may have their peripheries either concentric with the stock wire upon which they are supported, or, and preferably, they may be so formed as to present eccentric portions having their greater dimensions presented in position for effective traction in contact with the road.

They may be rotatable upon the supporting stock wire or may be held non-rotatably thereon by any suitable means, as for example by being welded in place, or they may be prevented from rotation by a non-circular formation of the stock wire and/or of the members themselves. The stock wire for the strand of which the links are formed may be of any suitable material, but in its now preferred form it is preferably constituted of a molybdenum alloy of wrought iron which will yield a high resistance to failure from impact in spite of the reduced section of the wire at the regions between the shoulders. The material of the reenforcing members may be selected to meet the conditions of any particular installations, but in its preferred form use may be made of an alloy of steel having high frictional characteristics, in view of the effective character of such an alloy from the standpoint of tractive and wearing properties.

The above and other features of the invention are illustrated and described fully in the acompanying drawing and specification and are pointed out in the claims.

In the drawing,

Fig. 1 is a view in side elevation of a stock wire grooved at intervals to form retaining shoulders for reenforcement members.

Fig. 2 is a similar view of a modified form of stock strand wire which has been worked by swaging or otherwise to produce shoulders extending outwardly from the periphery of the wire.

Fig. 3 is a view of wire like that shown in

Fig. 1 with reenforcement members in place thereon.

Fig. 4 is a similar view of a stock strand wire like that shown in Fig. 2, provided with reenforcement members at the shoulder portions.

Fig. 5 is a view of a plurality of links formed from the stock strand wire of Fig. 1, prior to application of the reenforcement members.

Fig. 6 is a similar view of a plurality of links formed of the stock strand wire shown in Fig. 2, prior to the application of reenforcement members.

Fig. 7 is a view of the links shown in Fig. 5 with reenforcement members applied thereto.

Fig. 8 is a similar view of the links shown in Fig. 6, provided with reenforcement members.

Fig. 9 is a sectional view taken on the line 9—9 of Fig. 7, transversely of one of the strands, with a reenforcement member shown in elevation.

Fig. 10 is a similar transverse section taken on the line 10—10 of Fig. 8.

Figs. 11 and 12 are similar sectional views of modifications.

Fig. 13 shows a plurality of links provided with reenforcements and twisted to constitute part of a curb chain suitable for use as an anti-skid cross chain in a tire chain the links illustrated being similar to those shown in Fig. 7.

Fig. 14 is a view similar to Fig. 13 of a plurality of twisted links of the type shown in Fig. 8.

Fig. 15 is a view in elevation of a reenforcement member shown separately.

In a now preferred embodiment of the invention selected for illustration and description to permit ready understanding of the invention, the part designated by the reference character 1 in Figs. 1, 3, 5, 7, 9, and 13 is a stock wire, which in the instance illustrated is of circular cross section and is preferably formed of a molybdenum alloy of wrought iron, as this material is adapted to give high resistance to failure through impact when formed into a link. In pursuance of the invention, the periphery of the wire is suitably swaged or otherwise worked, as for example in a rotary metal flowing machine of the "floformer" type, to form shoulders at intervals along the periphery, these shoulders in the form shown in Fig. 1 being constituted by the walls of the semi-circular annular depressions indicated by the reference characters 2, these depression being formed at intervals which correspond with the positions to be occupied in the completed links by the reenforcement members 3 shown in Figs. 7, 9, and 13 to be hereafter described.

Reenforcement members of suitable material and shape may be applied to the stock wire either before or after it has been formed into links, and if applied before such formation of links the reenforcement may conveniently take the form, for example, of a ring of wire such as that shown at 4 in Fig. 3, this reenforcement being a simple split ring formed by coiling wire around the stock wire at the proper regions, or by forming the attachments as split rings and clipping them in place upon the stock wire, either relying upon the natural stiffness of the reenforcement to hold it in place against transverse displacement, or welding the ends of the wire together and if desired welding them to the stock wire on which they are supported. As already indicated, the walls of the grooves 2 serve as means for holding such reenforcements against displacement lengthwise upon the stock wire.

While it is possible to apply the reenforcements before forming the stock wire into links, it is preferred to accomplish such reenforcement after formation, inasmuch as it is easier to accomplish at least the initial steps of link formation by existing machinery before the stock wire is encumbered with the reenforcement members. Accordingly, the stock wire shown in Fig. 1 may be formed into links by any conventional mode of treatment, as for example by severing from the stock wire provided with the depressions 2 a series of pieces each preferably having a plurality of depressions 2, as for example by severing the stock wire shown in Fig. 1 at the dotted line 5, the portion toward the left hand side of Fig. 1 constituting the material for one link of the chain to be made.

The link is then bent into the form shown in Fig. 5 in which the reference character 6 indicates the joint, which may be eventually welded, or otherwise treated to form a closed link.

It will be seen that the depressions 2 occupy offset positions relatively to the medial transverse axis of the link for a reason to be hereinafter referred to more particularly. In Fig. 7 two complete links are shown in articulated relation and part of a third link, all of these links being preferably identical in construction, so that only one need be described.

In Fig. 7 the links of Fig. 5 are shown, provided with reenforcement members 3 which in the instance illustrated are constituted by pieces of flat metal stock, as for example an alloy of steel, stamped with an eccentric aperture at 7, the material at the narrow side being split preferably as indicated at 8, (see Fig. 15) so that each disk shaped reenforcement may be readily sprung upon the stock wire 1 at the region of the depression 2 by opening the disk at 8, springing it upon the stock and clipping it in place by pressure applied to the periphery of the disk, the link shown in elevation in Fig. 7 having two such reenforcements as indicated, and the other links of the series being preferably similarly fitted with reenforcements.

As already indicated briefly, the reenforcements 3 may be supported rotatably upon the stock wire 1, or, preferably, they will be engaged non-rotatably therewith, as for example by the stiffness of the material or owing to the pressure applied in putting them in place, or by being welded, as for example at the region occupied by the split 8.

Rotation may also be prevented by other means, as for example by forming a reenforcement member such as that shown at 30 in Fig. 11 with a non-circular aperture 31 adapted to fit upon a non-circular strand wire 11 and the split portion 18 may be welded or not, as desired.

It will be understood that the links shown in Fig. 7 can be utilized in their straight form either for anti-skid links or for such other purposes as they may be adapted to serve.

I prefer, however, to utilize the invention in connection with a chain of the curb type having twisted links, and Fig. 13 illustrates the links of Fig. 7 as having been twisted respectively to form such a chain, the reenforcements 3 being now positioned at regions of each such twisted link which will in service as a cross chain of an anti-skid tire chain enter into contact with the road surface, so that the reenforcement members 3 will sustain the greater portion of the wear caused by traction, both in forward movement of the car and reverse movement thereof, and also during skidding or side swaying movements of the wheels.

Referring now to an embodiment of the invention which is illustrated in Figs. 2, 4, 6, 8, 10, 12 and 14, and to which brief reference has already been made, the stock wire 10 for the strands of which the links are composed may advantageously be worked by swaging or flowing the metal in a rotary swaging machine of the "floformer" type, or by other suitable means, to constitute a stock wire having annular enlargements or shoulders 12 at intervals, such as those shown on the wire illustrated in Fig. 2, such enlargements being formed in adjacent pairs, and between each pair of which a reenforcement member may readily be applied and there held against longitudinal displacement.

In Fig. 4 such a wire is shown as provided with reenforcement rings 9 prior to formation of the wire into links, but as already indicated it is preferred to carry out the formation of the wire into links prior to reenforcement thereof, and accordingly, in Fig. 6 several links are shown formed from pieces of stock wire 10 having the enlargements 12 as already described at intervals suitable to afford seats for the reenforcements 3 shown in Fig. 8.

The said reenforcements are in the instance illustrated formed of the same general shape, material, size, and arrangement as those already described with reference to Figs. 7, 9, and 13 and accordingly need not be described again in detail, it being understood that when applied to the stock 10 at the region of each pair of shoulders 12, the reenforcements 3 will be in a position to exert a tractive effect of the same character as that described with reference to the reenforcement members similarly characterized and described with reference to Figs. 7 and 13.

The wire links may be twisted after application of the reenforcement members thereto, as already described with reference to Fig. 13, and the shape of the reenforcement members may be modified as indicated in Fig. 12, or otherwise, Fig. 12 corresponding in essential respects to the modification illustrated in Fig. 11 and described with respect thereto.

Fig. 15 shows one of the reenforcement members in the form in which it is stamped out or otherwise prepared for application to the wire stock of the link. Such a reenforcement may as already mentioned be welded to the wire, or simply clipped thereto hot or cold and retained by the stiffness of the reenforcing member. In the latter case the depressions in the wire are preferably of irregular shape as indicated in Fig. 12 to prevent rotation, unless it is desired that there should be a possibility of rotation of the reenforcement members, in which event the shape may be that shown in Fig. 10. Of course, even with the shape shown in Fig. 10 rotation may be prevented by welding at the region 28 or elsewhere.

I claim:

1. The method of forming a reenforced link for a cross chain of an anti-skid tire chain, said method comprising the steps of forming shoulders upon a stock wire, severing from said stock wire a part including one or more shouldered portions, bending said part to form a link and applying separately formed substantially annular reenforcement members to said wire stock between adjacent shoulders.

2. The method of forming a reenforced link for a cross chain of an anti-skid tire chain, said method comprising the steps of forming shoulders upon a stock wire, severing from said stock wire a part including one or more shouldered portions, bending said part to form a link and applying separately formed substantially annular reenforcement members to said wire stock between adjacent shoulders and twisting said link in such a manner as to bring a plurality of reenforced portions thereof into position for road contact.

3. The method of forming reenforced cross chains for anti-skid tire chains, said method comprising the steps of forming shoulders upon a stock wire, severing from said stock wire parts including one or more shouldered portions, bending each of said parts to form a link and applying separately formed substantially annular reenforcement members to said wire stock between adjacent shoulders.

4. The method of forming reenforced cross chains for anti-skid tire chains, said method comprising the steps of forming shoulders upon a stock wire, severing from said stock wire parts including one or more shouldered portions, bending each of said parts to form a link and applying separately formed substantially annular reenforcement members to said wire stock between adjacent shoulders and assembling said links to form a chain.

5. The method of forming reenforced cross chains for anti-skid tire chains, said method comprising the steps of forming shoulders upon a stock wire, severing from said stock wire parts including one or more shouldered portions, bending each of said parts to form a link and applying separately formed substantially annular reenforcement members to said wire stock between adjacent shoulders and assembling said links to form a chain and twisting said links in such a manner as to bring a plurality of reenforced portions thereof into position for road contact.

6. The method of forming a reenforced link for a cross chain of an anti-skid tire chain, said method comprising the steps of forming shoulders upon a stock wire, applying separately formed substantially annular reenforcement members to said wire stock between and in engagement with adjacent shoulders, severing from said stock wire a part including one or more shouldered portions and the reenforcement members held thereby and bending said reenforced part to form a link.

7. The method of forming a reenforced link for a cross chain of an anti-skid tire chain, said method comprising the steps of forming shoulders upon a stock wire, applying separately formed substantially annular reenforcement members to said wire stock between and in engagement with adjacent shoulders, severing from said stock wire a part including one or more shouldered portions and the reenforcement members held thereby, bending said reenforced part to form a link and twisting said link in such a manner as to bring a plurality of reenforced portions thereof into position for road contact.

8. The method of forming reenforced cross chains for anti-skid tire chains, said method comprising the steps of forming shoulders upon a stock wire, applying separately formed substantially annular reenforcement members to said wire stock between adjacent shoulders, severing from said stock wire parts each including one or more shouldered portions and the reenforcement members held thereby and bending said reenforced parts to form links and assembling said reenforced links in a chain.

9. The method of forming reenforced cross chains for anti-skid tire chains, said method comprising the steps of forming shoulders upon a stock wire, applying separately formed substantially annular reenforcement members to said wire stock between adjacent shoulders, severing from said stock wire parts each including one or more shouldered portions and the reenforcement members held thereby, and bending said reenforced parts to form links, assembling said reenforced links in a chain and twisting said links in such a manner as to bring a plurality of the reenforced portions thereof into position for road contact.

10. The method of forming reenforced cross chains for anti-skid tire chains, said method comprising the steps of forming spaced grooves in the periphery of a stock wire, severing from said stock wire parts each including one or more of said grooved portions, bending said reenforced parts to form links and applying separately formed substantially annular reenforcement members to said grooved portions.

11. The method of forming reenforced cross chains for anti-skid tire chains, said method comprising the steps of forming spaced grooves in the periphery of a stock wire, severing from said stock wire parts each including one or more of said grooved portions, bending said reenforced parts to form links and applying separately formed substantially annular reenforcement members to said grooved portions and twisting said links in such a manner as to bring a plurality of reenforced portions thereof into position for road contact.

12. The method of forming reenforced cross chains for anti-skid tire chains, said method comprising the steps of flowing or working a stock wire to form annular enlargements or shoulders at spaced regions thereof, severing from said stock wire parts each including one or more of said enlargements, and applying separately formed substantially annular reenforcement members between said enlarged portions, whereby said reenforcements are maintained in their relative longitudinal positions on said wire, bending said reenforced parts to form links, and assembling said links to form a chain.

13. The method of forming reenforced cross chains for anti-skid tire chains, said method comprising the steps of flowing or working a stock wire to form annular enlargements or shoulders at spaced regions thereof, severing from said stock wire parts each including one or more of said enlargements, and applying separately formed substantially annular reenforcement members between said enlarged portions, whereby said reenforcements are maintained in their relative longitudinal positions on said wire, bending said reenforced parts to form links, and assembling said links to form a chain and twisting said links in such a manner as to bring a plurality of reenforced portions thereof into position for road contact.

14. The method of forming reenforced cross chains for anti-skid tire chains, said method comprising the steps of flowing or working a stock wire to form annular enlargements or shoulders at spaced regions thereof, severing from said stock wire parts each including one or more of said enlargements, and applying separately formed substantially annular reenforcement members between said enlarged portions, whereby said reenforcements are maintained in their relative longitudinal positions on said wire, bending said reenforced parts to form links, and assembling said links to form a chain said enlargements being formed in pairs with narrow spaces between the enlargements of each pair, said reenforcements being placed in the latter spaces.

In testimony whereof, I have signed this specification.

WALTER B. LASHAR.